Patented Oct. 3, 1950

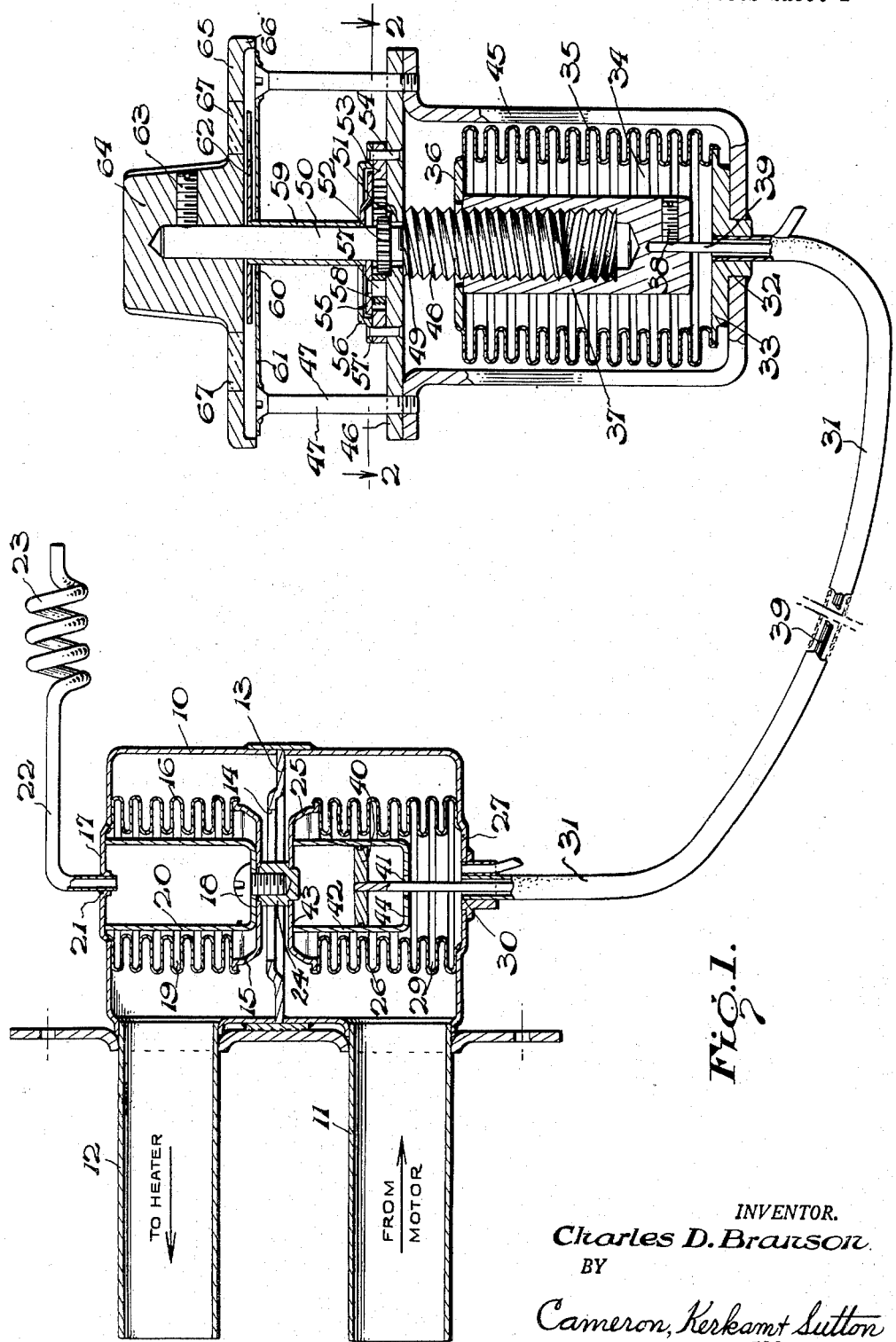

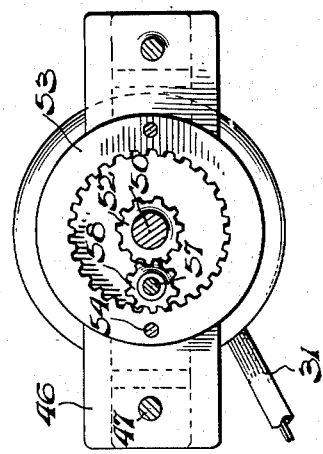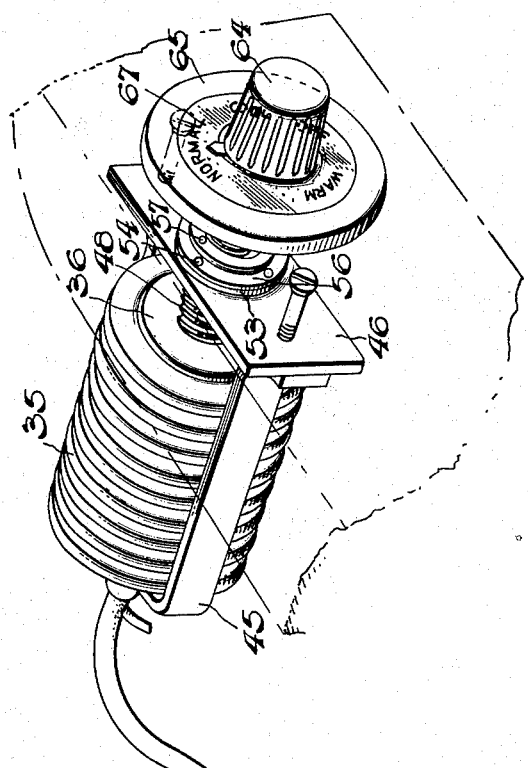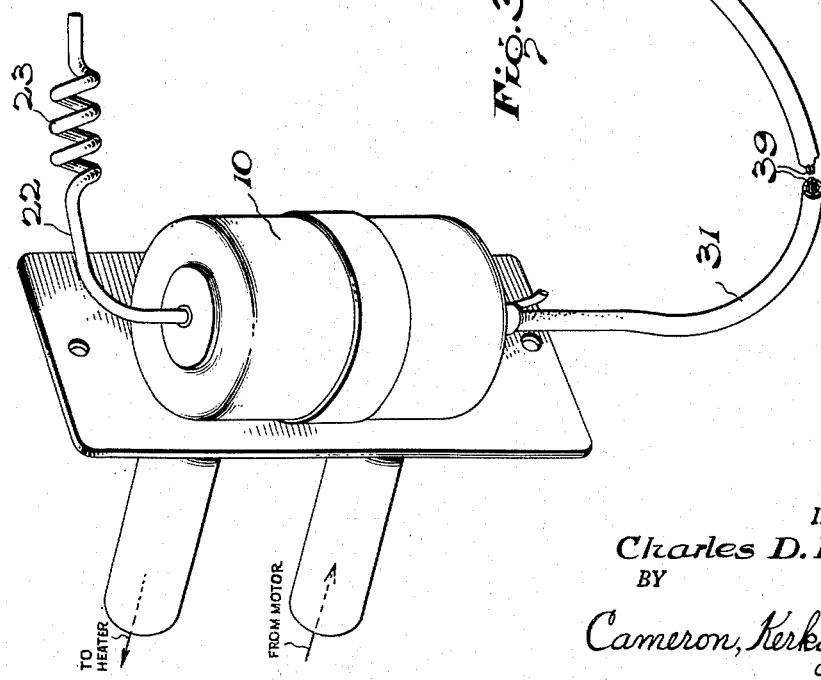

2,524,284

UNITED STATES PATENT OFFICE 2,524,284

TEMPERATURE REGULATOR

Charles D. Branson, Knoxville, Tenn., assignor to Robertshaw-Fulton Controls Company, a corporation of Delaware Application July 18, 1946, Serial No. 684,611

11 Claims. (Cl. 236—99)

This invention relates to temperature regulators, and more particularly to a regulator that is of high utility in controlling the flow of heating medium through a heater for automobiles and other comparable devices, although as will be apparent to those skilled in the art the invention is susceptible to a much wider application, and therefore it is to be expressly understood that explanation of the invention by reference to its use in conjunction with a car heater is by way of illustration and not of limitation.

In my copending application Serial No. 659,201, filed April 3, 1946 for Temperature Regulators, now Patent No. 2,511,042 of June 13, 1950, I have disclosed a temperature regulator including a valve member operatively connected to an expansible and collapsible chamber containing a thermosensitive fluid, whose temperature and pressure are varied by the temperature of the ambient, and a second expansible and collapsible chamber mounted in opposition to the first named chamber, and balanced with respect thereto, said second named chamber being in communication with a third expansible and collapsible chamber also subjected to the temperature of the ambient, said two last named chambers being charged with a vaporizable liquid or a gas so selected that at a predetermined rising temperature of the ambient the charge in said two last named chambers will observe the temperature and pressure laws governing superheated vapors or true gases and thereby effect a differential pressure between the first and second named chambers for moving the valve member toward closed position. The present invention is particularly concerned with a temperature regulator of the character disclosed in my aforesaid application although, as respects certain features of the present invention, as will be apparent to those skilled in the art, the improvements are of wider utility, within the broader aspects of the present invention, and therefore applicable to other types of regulators.

It is an object of the present invention to provide a temperature regulator, particularly of the character above summarized, with improved means for adjusting the temperature of response of the regulator which also includes means for rendering the regulator inoperative when desired.

Another object of the invention is to provide a temperature regulator with improved means whereby manipulation of a single member will at times adjust the temperature of response of the regulator and at other times render the regulator inoperative.

Another object of this invention is to provide an improved temperature regulator which has means for adjusting the temperature of response of the regulator while simultaneously indicating the setting thereof in a manner such that fine adjustment of the setting means is not required in order to obtain the desired temperature response.

Another object of this invention is to provide a device of the type characterized which is simple in construction, inexpensive to fabricate, assemble and install, and certain and efficient in operation.

Other objects will appear as the description of the invention proceeds.

The invention is capable of receiving a variety of mechanical expressions one of which is illustrated on the accompanying drawings, but it is to be expressly understood that the drawings are for purposes of illustration only and are not to be construed as a definition of the limits of the invention, reference being had to the appended claims for that purpose.

Referring in detail to the accompanying drawings wherein the same reference characters are employed to designate corresponding parts in the several figures, Fig. 1 is a section through a temperature regulator embodying the present invention but shown somewhat diagrammatically;

Fig. 2 is a cross section on the line 2—2 of Fig. 1; and

Fig. 3 is a perspective elevation of the embodiment of Fig. 1.

The invention has been illustrated and will be described, by way of exemplification, as embodied in a temperature regulator which may be, and is shown as, substantially of the same construction as illustrated and described in my aforesaid application. In the form shown a housing 10 of any suitable size, construction and material such as may be appropriately used, for example, in controlling the flow of a heating medium through an automobile heater, is provided with an inlet nipple 11 and an outlet nipple 12 which may be respectively connected to a hot water line of the engine cooling system and to the heater, so that heated water from the cooling system of the engine may be circulated from the inlet 11 through the housing 10 and out through the outlet 12 by the usual water pump of the cooling system.

Disposed in said housing 10 between the inlet 11 and the outlet 12 is a partition 13 formed in any suitable way and provided with a valve port 14. Mounted for cooperation with said valve port 14 is a valve member or poppet 15, here shown as a member which is hermetically sealed to one end of an expansible and collapsible corrugated tubular wall or bellows 16, the opposite end of which is formed integrally with or hermetically sealed to a stationary end wall 17, here shown as sealed in any suitable way into an aperture formed in the wall of the housing 10. Interiorly of the chamber 19 within said bellows and shown as suitably attached to the valve member 15, as by a screw 18, is a suitable stop member 20 adapted to engage the end wall 17 and limit the extent to which chamber 19 can be collapsed. Hermetically sealed into an aperture 21 in said end wall 17 is a suitable tube 22, preferably of capillary size, which communicates with a bulb, coil or other suitable container 23 for a thermosensitive fluid, such as a volatile liquid, constituting the thermostatic charge that is to effect expansion and contraction of chamber 19.

Valve 15 is connected in any suitable way, as by a post 24, to a member 25 preferably of the same size as valve member 15. Hermetically sealed to member 25 is an expansible and collapsible corrugated tubular metal wall or bellows 26 having its opposite end formed integrally with or hermetically sealed to a stationary end wall 27, here shown as sealed in any suitable way into an aperture formed in the housing 10. Communicating with the chamber 29 within said bellows 26, and hermetically sealed into an aperture 30 in the end wall 27, is a tube 31 preferably of capillary size which extends to any suitable distance where its opposite end is hermetically sealed into an aperture 32 in the stationary end wall 33 of a third expansible and collapsible chamber 34, here shown as having its peripheral wall formed by an expansible and collapsible corrugated tubular wall or bellows 35 hermetically sealed to said stationary end wall 33 at one end and formed integrally with or hermetically sealed to a movable end wall 36 at its opposite end.

Suitably attached to said movable end wall 36 as by brazing or soldering is an interiorly threaded tubular nut 37 projecting into the chamber 34. Attached to said nut in any suitable way, as by a set screw 38, is a wire 39 of any suitable material, such as stainless steel, which is possessed of sufficient rigidity to effect the operation hereinafter described and which is of an outside diameter sufficiently less than the inside diameter of the tube 31 as not to interfere with the free flow of fluid between the chambers 34 and 29 as hereinafter explained. The opposite end of wire 39 has secured thereto in any suitable way, as by upsetting, staking, soldering or brazing, a member 40 which may be in the form of a disk or spider. Wire 39 passes through an aperture 41 in a tubular bracket, spider or the like 42 which is rigidly secured at 43 to the movable end wall 25 of chamber 29, as by soldering or brazing. Bracket 42 has its opposite end 44 bent radially inwardly to provide the guiding aperture 41 and to constitute an abutment member for the member 40 as hereinafter explained. Bracket 42 may be of any suitable construction, as a complete cup having the aperture 41 formed in its bottom, or it may be of more or less open construction to provide free flow of fluid therethrough. Member 40 is shown as substantially conforming in outside diameter to the inside diameter of the bracket 42 so that the former is guided by the bracket 42, but this is not essential as will appear from the ensuing description.

Chamber 34 may be supported in any suitable way as by a bracket 45 attached to a stationary plate 46 of any suitable shape, as by bolts, screws or the like 47 as hereinafter referred to. An elongated threaded member or screw 48 extends into and has threaded engagement within the tubular nut 37 and has a shoulder 49 abutting the face of the plate 46 so as to prevent axial movement of the screw 48 with respect to said plate. Extending from the end of screw 48 is a spindle 50 of smaller outside diameter than said screw, said spindle extending through an aperture 51 in plate 46 to any convenient position for manual manipulation thereof as hereinafter explained. Formed on or rigidly secured to said spindle 50 is a pinion 52. Mounted on plate 46 is a ring gear 53 secured to said plate against rotation in any suitable way, as by one or more pins 54, and disposed so as to be concentric with the pinion 52 and spindle 50. Slidably mounted on said ring gear at its periphery is a plate 55 secured in position by the overlapping flange 56 of a retaining plate 57' which may be secured in position by the pin or pins 54. Plate 55 has secured thereto a short stub shaft 57 which carries an idler pinion 58 that is in mesh with the teeth of both the pinion 52 and the ring gear 53. Plate 55 has integrally formed thereon or suitably attached thereto a tube 59 which is rotatably mounted on the spindle 50.

Spindle 50 and tube 59 extend through the aperture 60 of a dial plate 61, here shown as mounted on the plate 46 by the screws 47, and tube 59 at its outer end has formed thereon or suitably secured thereto a pointer 62. Attached to the outer end of the spindle 50 in any suitable way, as by the set screw 63, is a knob 64 provided with a radially extending flange 65 which is preferably of such extent as to overlie and, if desired, embrace the periphery of the dial plate 61 as shown at 66. The flange 65 of knob 64 is formed in any suitable way with a transparent annular portion 67 which overlies suitable indicia on the dial plate 61. Knob 64 with its flange 65 may be conveniently formed of transparent material which may be sand blasted or otherwise suitably treated so as to render at least the flanged portion thereof translucent or opaque except for the circular band or annulus 67.

Depending upon the gear ratio existing between the pinions 52 and 58 and the ring gear 53, a plurality of turns of the knob 64 secured to spindle 50 is required to effect a single rotation of the tube 59 and its pointer 62. Thereby the screw 48 attached to the spindle 50 and the tubular nut 37 may be appropriately threaded so that a plurality of turns of the screw is required in order to move the nut and the movable end wall 36 of chamber 34 from one limit to the other of its proper range of motion to effect the desired adjustment of the complementary volumes of chambers 34 and 29. In so rotating the spindle 50 the pinion 52 thereon will rotate the idler pinion 58 on its stub shaft 57, causing the latter to walk around the ring gear 53 at a rate determined by the gear ratio but at a lower rate of speed than the spindle 50.

For example, if the gear ratio is 4 to 1 it will require four revolutions of the spindle 50 to produce one revolution of the tube 59 and pointer 62. Therefore, the thread between the screw 48 and tubular nut 37 may be so selected that it will require three complete revolutions of the spindle 50 to move the movable end wall 36 from one extremity to the other of its designed operating range for varying the temperature to be maintained by the regulator because of the composite action of the chambers 19 and 29 on the valve member 15 as explained in my aforesaid application. Accordingly, the dial plate 61 may be provided at positions 90° apart with appropriate indications, such as "cool," "normal" and "warm" which are readily visible through the transparent annulus 67 as shown in Fig. 3, the flange 65 of knob 64 fully protecting the dial and pointer without obscuring convenient reading of the indications afforded thereby. As these indications are not crowded together on the dial no nice adjustment of the knob 64 is required, so that the desired temperature condition to be maintained can be readily set by manipulation of the knob 64. However, any other desired arrangement for indicating the setting can be provided on the dial plate 61.

When the knob 64 is rotated in such direction as to move the movable end wall 36 of the chamber 34 toward its stationary end wall 33, the fluid is said chamber 34, whether it be a vaporizable liquid or a gas, such as air, is displaced through the tube 31 into the chamber 29, expanding the latter and imposing a corresponding greater opposition to the expansion of chamber 19, whereby a higher temperature must exist at the bulb 23 in order to effect the closure of the valve member 15. On the other hand, movement of the movable end wall 36 away from the stationary end wall 33 will increase the volume of chamber 34, withdrawing fluid from chamber 29 and collapsing the latter so that a lower temperature at the bulb 33 will effect the closure of the valve member 15.

If it is desired to positively close the valve member 15 and thereby render the heater inoperative, knob 64 may be further turned in the last named direction so as to move movable end wall 36 still farther away from stationary end wall 33. Movement of the tubular nut 37 upwardly as viewed in Fig. 1 will exert a pull on wire 39 which is transmitted to the member 40, causing member 40 to move downwardly as viewed in the drawings and engage the abutment portion 44 of the bracket 42, and thereafter exerting a pull on the end wall 25 which is connected to the valve member 15 through post 24, so that valve member 15 is positively drawn into position for closing the port 14. For example, this further movement of the tubular nut 37 to effect a positive closure of the valve 15 may be accomplished by one additional rotation of the screw 48, in which event, under the conditions above assumed for a 4 to 1 gear ratio, the fourth quadrant of the dial plate 61 may be provided with suitable indicia, such as "off," to indicate that when the pointer 62 reaches this location the heater has been turned off.

It will therefore be perceived that by the present invention a single means has been provided for adjusting the temperature regulator to maintain the desired temperature and for rendering the device inoperative by a further movement of the same adjusting means. Thereby separate provisions for adjusting the temperature to be maintained by the regulator and for turning the regulator on and off have been avoided. As soon as the knob 64 has been turned one complete revolution from its "off" position the member 40 is moved out of contacting relationship with respect to the abutting portion 44 of the bracket 42, so that member 40 in no way interferes with the normal and intended operation of the expansible and collapsible chamber 29 during normal operation to effect temperature regulation. Such complete revolution of the knob 44 also brings the pointer 62 to the lowest indication of the range of temperature adjustment provided by the dial plate 61, and thereafter the knob 64 may be manipulated as desired to increase or decrease the temperature being maintained by the regulator. If at any time it is desired to turn the regulator off, however, the knob 64 may be rotated as before described beyond the range of temperature adjustment to effect positive closure of the valve member 15.

The adjusting mechanism as heretofore described enables the dial and pointer to be readily seen, but they are fully protected by the knob and its flange, and owing to the ratio of movement provided between the spindle 50 and the pointer 62 the tubular nut 37 may be given such an amount of axial movement as to effect the desired displacement of the movable end wall of the chamber 34 to such an amount as to give the desired range of temperature adjustment while the pointer 62 need make but a single revolution or less than a complete revolution. This ratio of movement further facilitates a ready indication of the character of temperature to be maintained without requiring nice and accurate adjustment such as exist when the knob and pointer have a 1 to 1 ratio of movement. The device is simple in construction, composed of readily and inexpensively fabricated parts, and therefore easy to assemble and install, and yet the device is positive, certain and efficient in action.

While the embodiment of the invention illustrated on the drawings has been described with considerable particularity, it is to be expressly understood that the invention is not limited thereto as the same is capable of receiving a variety of expressions as will now be apparent to those skilled in the art, while certain features may be used without other features, and changes may be made in the details of construction, arrangement, proportion, material, etc., without departing from the spirit of the present invention. While the invention has been exemplified as applied to the type of regulator disclosed in my aforesaid application, it will now be apparent that within its broader aspect some of the features of the present invention may be employed in conjunction with other suitable regulators using other forms and construction of thermostats, other principles of operation, etc. Reference is therefore to be had to the appended claims for a definition of the invention.

What is claimed is:

1. In a temperature regulator, in combination with a valve member, a thermostat operatively connected to said member for operating the same, and means forming an expansible and collapsible chamber additional to said thermostat having means positively connected to said valve member for positively moving said valve member to control the temperature at which said valve member is closed by said thermostat, means for adjusting the volume of said chamber to vary the temperature at which said valve member is closed, and means operated by movement of said last named means for positively moving said valve member to closed position.

2. In a temperature regulator, in combination with a valve member, a thermostat operatively connected to said member for operating the same, and means forming an expansible and collapsible chamber additional to said thermostat having means positively connected to said valve member and cooperating therewith in opposition to said thermostat to move said valve member and thereby predetermine the temperature at which said valve member is closed by said thermostat, an expansible and collapsible chamber in communication with said first named chamber, means for adjusting the volume of said last named chamber to vary the volume of said first named chamber and therefore the temperature at which said valve member is closed, and means operated by said last named means for positively closing said valve member.

3. In a temperature regulator, in combination with a valve member, a thermostat operatively connected to said member for operating the same, and an expansible and collapsible chamber having a movable element positively connected to said valve member and cooperating therewith in opposition to said thermostat to move said valve member and thereby predetermine the temperature at which said thermostatically operated valve member is closed, an expansible and collapsible chamber in communication with said first named chamber, means for adjusting the volume of said last named chamber to vary the volume of said first named chamber and therefore the temperature at which said valve member is closed, and means operated by said last named means for positively closing said valve member, said last named means including normally spaced members in said first named chamber one of which is operatively connected to said movable element of said chamber, and a connection from the other of said members to said means for adjusting said second named chamber for engaging said normally spaced members and positively displacing said valve member to closed position.

4. In a temperature regulator, in combination with a valve member, a thermostat operatively connected to said member for operating the same, an expansible and collapsible chamber having a movable portion positively connected to said valve member and cooperating therewith to move said valve member and thereby predetermine the temperature at which said valve member is closed by said thermostat, a second expansible and collapsible chamber, a tubular connection between said chambers, means for adjusting the volume of said second named chamber to vary the volume of said first named chamber, and a mechanical connection from said last named means extending through said tubular connection for positively actuating said movable portion of said first named chamber and moving said valve member to closed position upon displacement of said adjusting means to limit position.

5. In a temperature regulator, in combination with a valve member, a thermostat operatively connected to said valve member for operating the same, and an expansible and collapsible chamber positively connected to said valve member in opposition to said thermostat for moving said valve member independently of said thermostat, means for adjusting the volume of said chamber and including a second expansible and collapsible chamber provided with a movable end wall, a tubular connection between said chambers and means for moving said movable end wall to vary the volume of said second named chamber, and means operatively connected to said movable end wall and to said valve member for positively closing the latter from said means for moving said movable end wall.

6. In a temperature regulator, in combination with a valve member, a thermostat operatively connected to said valve member for operating the same, and an expansible and collapsible chamber positively connected to said valve member in opposition to said thermostat for moving said valve member independently of said thermostat, means for adjusting the volume of said chamber and including a second expansible and collapsible chamber provided with a movable end wall, a tubular connection between said chambers and means for moving said movable end wall to vary the volume of said second named chamber, and means operatively connected to said movable end wall and to said valve member for positively closing the latter from said means for moving said movable end wall, said last named means including a pair of normally spaced members in said first named chamber one of which is positively connected to said valve member and the other of which is positively connected to said movable end wall.

7. In a temperature regulator, in combination with a valve member, a thermostat operatively connected to said valve member for operating the same, and an expansible and collapsible chamber positively connected to said member in opposition to said thermostat for moving said valve member independently of said thermostat, means for adjusting the volume of said chamber and including a second expansible and collapsible chamber provided with a movable end wall, a tubular connection between said chambers and means for moving said movable end wall to vary the volume of said second named chamber, and means operatively connected to said movable end wall and to said valve member for positively closing the latter from said means for moving said movable end wall, said last named means including a pair of normally spaced members in said first named chamber one of which is positively connected to said valve member and a wire extending from the other of said members through said tubular connection and connected to said movable end wall.

8. In a temperature regulator, in combination with a valve member, a thermostat operatively connected to said valve member for operating the same, and an expansible and collapsible chamber having a movable part operatively connected to said valve member in opposition to said thermostat for moving said valve member independently of said thermostat, means for adjusting the volume of said chamber and including a second expansible and collapsible chamber provided with a movable end wall, a tubular connection between said chambers and means for moving said movable end wall to vary the volume of said second named chamber, means operatively connected to said movable end wall and to said valve member for positively closing the latter from said means for moving said movable end wall, said last named means including a bracket positively connected to a movable part of said first named chamber, a second member guided by said bracket and adapted to be moved into engagement therewith for positively displacing said movable part, and a wire connected to said last named member and extending through said tubular connection, said wire being connected to said movable end wall for actuation thereby.

9. In a temperature regulator, in combination with a valve member, a thermostat operatively connected to said valve member for operating the same, and an expansible and collapsible chamber operatively connected to said valve member in opposition to said thermostat for moving said valve member independently of said thermostat, means for adjusting the volume of said chamber and including a second expansible and collapsible chamber provided with a movable end wall, a tubular connection between said chambers and means for moving said movable end wall to vary the volume of said second named chamber, and means operatively connected to said movable end wall and to said valve member for positively closing the latter from said means for moving said movable end wall, said means for moving said end wall including a screw and nut one of which is positively connected to said movable end wall and the other of which includes a spindle provided with manual means for operating the same, a dial and pointer associated with said spindle, and reducing gearing between said spindle and pointer for operating said pointer from said spindle at a reduced rate of speed.

10. In a temperature regulator, in combination with a valve member and an expansible and collapsible chamber operatively connected to said member, means for adjusting the volume of said chamber and including a second expansible and collapsible chamber provided with a movable end wall, a tubular connection between said chambers and means for moving said movable end wall to vary the volume of said second named chamber, and means operatively connected to said movable end wall and to said valve member for positively closing the latter from said means for moving said movable end wall, said means for moving said end wall including a screw and nut one of which is positively connected to said movable end wall and the other of which includes a spindle provided with manual means for operating the same, a dial and pointer associated with said spindle, and reducing gearing between said spindle and pointer for operating said pointer from said spindle at a reduced rate of speed, said manual means including a knob provided with a flange in overlying protective relationship to said dial and pointer and provided with a transparent portion through which said dial and pointer may be observed.

11. In a temperature regulator, in combination with a valve member, a thermostat operatively connected to said valve member for operating the same, and an expansible and collapsible chamber operatively connected to said valve member in opposition to said thermostat for moving said valve member independently of said thermostat, means for adjusting the volume of said chamber and including a second expansible and collapsible chamber provided with a movable end wall, a tubular connection between said chambers and means cooperating with said movable end wall for adjusting the volume of said second named chamber, said last named means including a pair of cooperating threaded members one of which is positively connected to said movable end wall and the other of which is provided with a spindle, manual means for operating said spindle, a dial and pointer associated with said spindle, and reducing gearing between said spindle and pointer for actuating said pointer from said spindle at a reduced rate of speed.

CHARLES D. BRANSON.

REFERENCES CITED

The following references are of record in the file of this patent:

UNITED STATES PATENTS

| Number | Name | Date |
|---|---|---|
| 1,601,968 | Huth | Oct. 5, 1926 |
| 1,919,129 | Reichel | July 18, 1933 |
| 1,925,530 | Gotthardt | Sept. 5, 1933 |
| 2,109,114 | Kerr | Feb. 22, 1938 |
| 2,151,050 | Rudolph et al. | Mar. 21, 1939 |
| 2,332,556 | Breese | Oct. 26, 1943 |

FOREIGN PATENTS

| Number | Country | Date |
|---|---|---|
| 103,121 | Australia | Jan. 27, 1938 |